Aug. 5, 1924.

B. E. FRANKE

Re. 15,887

TINSEL REFLECTOR

Original Filed April 6, 1923

Witnesses

Lorenz H. Pauli

E. Wehmeyer

Inventor

Bernard E. Franke

By Edwin L. Sammels

Attorney

Reissued Aug. 5, 1924.

Re. 15,887

UNITED STATES PATENT OFFICE.

BERNARD E. FRANKE, OF BALITMORE, MARYLAND, ASSIGNOR TO THE GEORGE FRANKE SONS COMPANY, A CORPORATION OF MARYLAND.

TINSEL REFLECTOR.

Original No. 1,479,037, dated January 1, 1924, Serial No. 630,204, filed April 6, 1923. Application for reissue filed April 22, 1924. Serial No. 708,321.

*To all whom it may concern:*

Be it known that I, BERNARD E. FRANKE, a citizen of the United States, and a resident of the city of Baltimore, State of Maryland, have invented a new and useful Improvement in Tinsel Reflectors, of which the following is a specification.

The present invention relates to a tinsel reflector for use on Christmas trees. The reflector consists of a mat of tinsel strips radiating from a central point near which point a small electric light of the kind ordinarily used for the decoration of Christmas trees is placed. The reflector so constructed makes an exceedingly attractive Christmas tree ornament which can be produced at a small cost.

As the tinsel strips constituting the reflecting material are of metal, usually soft, non-corrosive, cheap, easily worked alloy which is a good conductor of electricity, the use of the tinsel in the immediate vicinity of the sockets often causes short-circuiting and burning of the fuse so that the lights are, in many instances, extinguished almost as soon as the current is turned on.

For this reason, the applicant who is a manufacturer of such ornaments, after considerable experimentation with these reflectors, made the further improvements herein described.

It is of importance to note that reflectors of this type, on account of the fragility of the material, are difficult to produce in such form that they may be supported at the centre on a light socket, as described, so that they will retain their position in the scheme of decoration with a reasonable degree of permanency.

To meet the difficulties thus recited, the inventor has devised and provided the following preferred structure. There is a central support which engages the inner end portions of all the radiating tinsel strips and which also engages the light socket supporting the tinsel strips on the light socket or bulb shank, insulating them from the socket and from the shank of the light bulb. The supporting member is centrally apertured to fan the bulb shank and is of insulating material having a peripherally arranged pocket to receive the inner ends of the radiating tinsel strips.

Usually the supporting member consists of a double washer, i. e., two centrally apertured pieces of fibrous material, preferably having insulating properties, the same being secured together with the central apertures in registration, the radiating tinsel members having their inner ends disposed between the outer edge portions of the two pieces, and held between them, preferably by a suitable adhesive which also holds the pieces together.

In the accompanying drawings I have illustrated a reflector lamp and lamp socket constructed and arranged in accordance with my invention.

Figure 3:
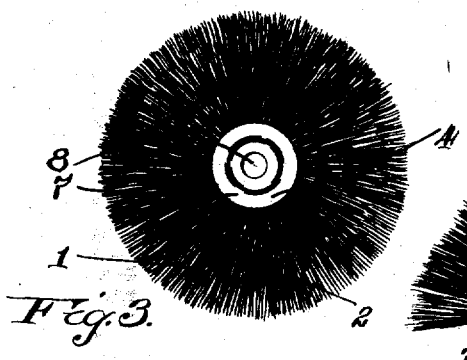
Figure 3 is a view of the reflector without the light and socket, the same being taken in the direction of the axis and substantially at right angles to Figure 2.
Figure 2:
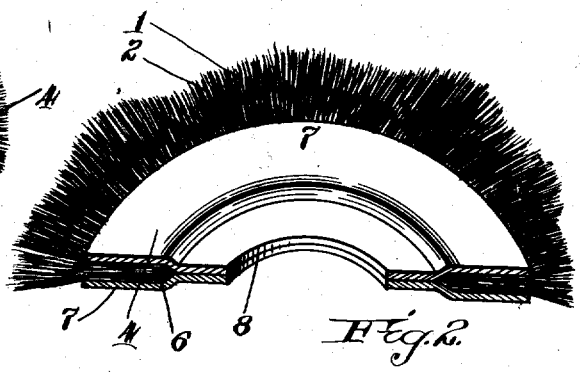
Figure 2 is a view similar to Figure 1 except that the outer ends of the tinsel members are broken away and that the light and socket are not shown.
Figure 1:
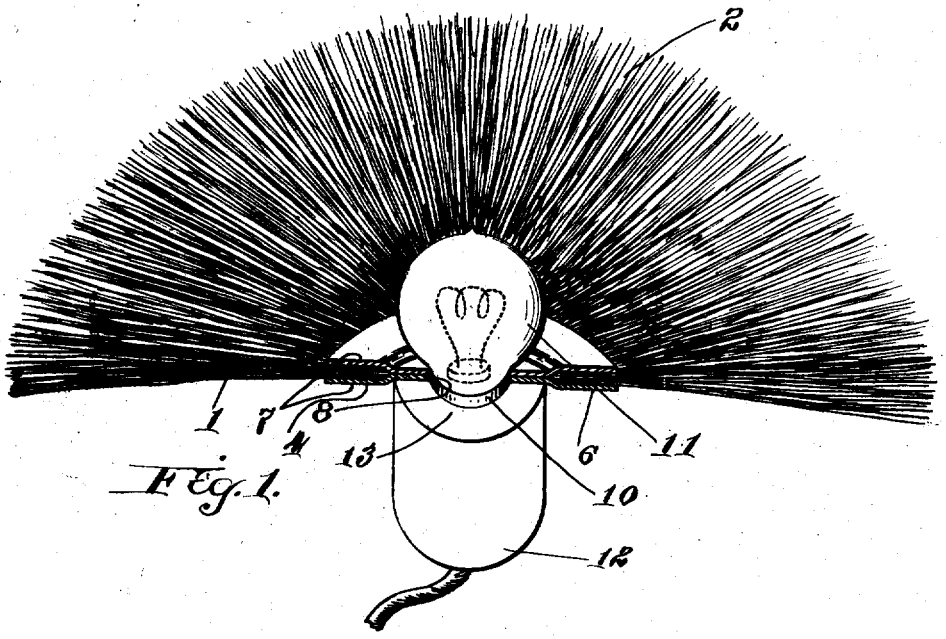
Figure 1 is a sectional elevation showing a reflector, light and socket constructed and arranged in accordance with my invention, the section being taken on a diametrical line and the light and the socket being shown in elevation; for convenience of illustration, the parts are turned up slightly in perspective.

Referring to the drawings by numerals, each of which is used to indicate the same or similar parts in the different figures, the reflector 1 is composed of radiating metallic tinsel strips 2, preferably of a soft, cheap, non-corrosive metal. The tinsel strips are held at their inner ends in a suitable support 4, preferably of fibrous material. This, as shown, is circular, i. e., in the form of a disk, and is formed with a peripherally extending pocket 6, to receive the inner ends of the tinsel strips to which they are held to the best advantage by adhesive.

The central support 4 is in the form of the invention shown and preferably built up of a plurality of washers or disks 7, of fibrous or other suitable non-conducting material apertured at 8 and fastened together with the apertures in registration, the parts being secured by means of adhesive or in any other suitable manner. The support is thus centrally apertured, the apertured portion is duly insulated and the tinsel-reflecting members are supported in a radial position in relation to the light bulb and back of the same, the intended assemblage of the apparatus being that shank 10 of the bulb 11 is passed through the aperture 8 and seated in the socket 12, the front face 13 of the socket serving to position the reflector, supporting member 4, which rests on the socket, which socket and bulb shank are thus insulated from the metallic tinsel.

I have thus described specifically a single embodiment of my invention in order that the nature and the operation of the same may be fully understood; however, the specific terms herein are used descriptively rather than in a limiting sense, the scope of the invention being defined in the claims.

What I claim and desire to secure by Letters Patent is:

1. The combination with a light bulb and socket of a reflector composed of radiating tinsel and a central holder for the tinsel consisting of a disk having a central aperture to pass the shank of the bulb.

2. The combination with a light bulb and socket of a reflector composed of radiating tinsel and a central holder for the tinsel consisting of a disk having a central aperture to pass the shank of the bulb and adapted to rest against the front face of the socket.

3. An ornamental reflector for decorating Christmas trees consisting of a mat of radiating tinsel members and a central holder therefor composed of a plurality of sheets of non-conducting material, part of said sheets being on each side of the tinsel, said holder being apertured near the centre of the reflector.

4. A Christmas-tree ornament consisting of a reflector composed of a mat of tinsel strips so arranged that the tinsel members radiate substantially from a single centre, means for holding and supporting the inner ends of said tinsel members, consisting of sheets of fibrous material secured together and to said tinsel members and apertured near the centre of the reflector to receive and pass the shank of a light pump.

5. The combination with an electric light bulb and a socket therefor of a Christmas tree ornament consisting of a reflector composed of a mat of radiating tinsel strips and a central support for the same of insulating material, the support having an aperture receiving and enclosing the shank of the electric light bulb and engaging the edge of the socket.

Signed by me at Baltimore, Maryland, this 15th day of April, 1924.

BERNARD E. FRANKE.

Witnesses:

P. H. FLAUTT,
E. WEHMEYER.